United States Patent [19]

Okada

[11] 4,170,669

[45] Oct. 9, 1979

[54] METHOD FOR MARKING FABRIC WITH ERASABLE COLOR MARKING COMPOSITION

[76] Inventor: Ichiro Okada, 7-1, 1-chome Oakayama, Meguro-ku, Tokyo, Japan

[21] Appl. No.: 822,207

[22] Filed: Aug. 5, 1977

Related U.S. Application Data

[62] Division of Ser. No. 633,177, Nov. 19, 1975, abandoned.

[30] Foreign Application Priority Data

Nov. 25, 1974 [JP] Japan .................................. 49-134319
Jan. 11, 1975 [JP] Japan .................................. 50-5297

[51] Int. Cl.² ............................................. B05D 3/10
[52] U.S. Cl. ................................... 427/275; 106/19; 427/288
[58] Field of Search ................ 106/19, 22, 23, 21; 427/290, 145, 288, 273, 275

[56] References Cited

U.S. PATENT DOCUMENTS

| | | | |
|---|---|---|---|
| 2,771,374 | 11/1956 | Chambers et al. | 106/25 |
| 2,868,741 | 1/1959 | Chambers et al. | 106/24 |
| 3,073,707 | 1/1963 | Clark et al. | 106/22 |
| 3,395,202 | 7/1968 | Yen | 106/26 X |
| 3,627,546 | 12/1971 | Coppeta | 106/19 |
| 4,030,934 | 6/1977 | Iijima | 427/145 X |

FOREIGN PATENT DOCUMENTS 1933793 1/1971 Fed. Rep. of Germany ............. 106/21

OTHER PUBLICATIONS

Grant, Julius (ed.), *Hackh's Chemical Dictionary*, 4th ed., New York, McGraw-Hill Book Co., 1972, p. 121.

*Primary Examiner*—Evan K. Lawrence
*Attorney, Agent, or Firm*—Bacon & Thomas

[57] ABSTRACT

A method is provided for color marking wherein a color marking composition is ejected through a hollow needle into each of piled fabric pieces, said composition containing a water dispersion of an acid- and/or base-soluble inorganic pigment, a penetrant, a volatization retardant and an anti-settling agent. The mark obtained by this process is erasable with an appropriate acid or base.

10 Claims, No Drawings

METHOD FOR MARKING FABRIC WITH ERASABLE COLOR MARKING COMPOSITION

This is a division of application Ser. No. 633,177, filed Nov. 19, 1975, now abandoned.

BACKGROUND OF THE INVENTION

I. Field of the Invention

This invention relates to a method for leaving a mark on a fabric at a prescribed point in order to indicate a sewing position before sewing is made of the fabric to fit buttons and darts. More particularly it relates to such a method wherein a marking composition is ejected from a hollow needle which has pierced through piled fabric pieces, leaving a color mark on each of the fabric pieces.

II. Description of Prior Art

There are several known processes to provide a mark or marks on each of piled fabric pieces, prior to sewing, at a prescribed position such as button-fitting and dart-fitting positions. Among the well-known processes are perforation process, i.e. piercing a pile of fabric pieces with a needle to provide a hole in each piece, and hot perforation process, i.e. passing a heated needle through piled fabric pieces and marking them by scorching. Further, there is known a thread marking process by passing a thread-carrying needle through the piled fabric pieces, removing the needle with the thread left in the fabric pieces and cutting up the thread while the fabric pieces are taken off one by one, so as to cause the cut-up portions thereof to remain in each piece.

However, the perforation process cannot be applied to coarse woven fabric such as wool-like cloth since the marking hole made by this process will close some time after the needle is withdrawn. The hot perforation process has the drawback that the noticeable thermal cutting of fibers occurs and results in raveling of woven fibers, and the marks become unclear increasingly from the upper fabric pieces to the lower ones because in piercing the piled fabric pieces, the heated needle has its temperature lowered more at its tip. The thread marking process is accompanied with the drawback that a cut-up portion of the marking thread in each fabric piece is likely to come off. In addition the process is time-consuming, requiring about 20 seconds for a most skilled person.

Further, a process employing a coloring material is known which comprises dipping a needle with a spiral groove in an aqueous suspension of pigment and passing the needle through a pile of fabric pieces so as to leave the pigment in the groove on each piece. The color mark thus put is sufficiently distinct on the upper-positioned fabric piece but can hardly be perceived on the lower-positioned fabric piece. An improved process comprises passing a hollow needle through piled fabric pieces at a prescribed position and ejecting, during the piercing of the needle into or out of the fabric pieces, a color marking liquid from the tip of the needle thereby to put a color mark on each fabric piece. This process can uniformly provide a mark on each piece since the needle ejects the marking liquid all the time it pierces the fabric pieces. The marking liquid disclosed in the disclosure is an aqueous solution of a coloring agent and contains a water-soluble thickening agent such as polyvinyl alcohol or carboxymethyl cellulose as a flow control agent.

SUMMARY OF THE INVENTION

The present inventor has studied on a process for providing a color mark on each of piled fabric pieces by flowing a marking agent out through a hollow needle, and has found that such agent must satisfy the following requirements:

(I) It can provide a clear and distinct mark on each fabric piece of any color;

(II) It does not clog in the needle;

(III) It can provide a mark which becomes non-adherent about 5 to 10 minutes after the marking so that subsequent sewing operation may be made of the fabric piece;

(IV) It can provide a mark resistant to heat treatment and water-spraying during the sewing operation; and (V) It can provide a mark which can be easily erased when required.

Accordingly, an object of the invention is to provide a marking agent which satisfies the above-mentioned requirements.

This invention provides a method for putting a color mark on each of piled fabric pieces comprising passing a hollow needle through the pile of fabric pieces and ejecting a marking composition from the needle, said composition comprising a water dispersion of a heat-resistant inorganic pigment which is soluble in acid and/or base and substantially insoluble in water and contained in an amount sufficient to provide a color mark on each fabric piece, an anti-settling agent in an amount sufficient to maintain the pigment dispersed in water, a water-miscible volatilization retardant in an amount sufficient to make the evaporation rate of the dispersion lower than that of water, and a water-miscible penetrant in an amount sufficient to improve the penetrability of the composition to the fabric piece.

If a white pigment which is soluble only in either acid or base is selected as inorganic pigment and if an acid-base indicator is further incorporated which provides a color in either acidic region or basic region and is colorless in the other one of these regions, marking compositions of various colors are obtained by adjusting the pH of the composition so as to cause colors to derive from the indicator.

DETAILED DESCRIPTION OF PREFERRED EMBODIMENTS

The color marking composition according to this invention is comprised mainly of a water dispersion of a pigment. The pigment is accordingly hardly soluble to water, i.e., substantially insoluble in water. Further, it must have a covering power in order to fulfil the requirement (I), that is, to provide a clear and distinct mark on fabric. Therefore, an inorganic pigment is selected which is generally resistant to heat, thus satisfying the requirement (IV), too.

In this invention, the requirement (V) is particularly important among the requirements. As mentioned above, a mark is to indicate button-fitting positions, dart-fitting positions and the similar sewing positions on fabric. If the mark is too small to be conspicuous, it may remain on fabric. Otherwise it often needs to be erased off the fabric. The required mark-erasing can be accomplished by this invention which is based on the fact that if the mark is made by the pigment soluble in acid and/or base, it can be eliminated by contact with the acid or base.

Representative examples of such inorganic pigment are shown below in Table 1. A mixture of these pigments can also be used.

Table 1

| Pigments | Color | Solubility* Acid | Solubility* Base |
|---|---|---|---|
| Zinc White | White | S | S |
| Cadmium Oxide | White | S | I |
| Zinc Yellow | Yellow | S | S |
| Antimony White | White | S | S |
| Titanium Oxide (rutile) | White | S | S |
| Calcium Carbonate | White | S | I |
| Magnesium Carbonate | White | S | I |
| Basic Lead Carbonate | White | S | S |
| Barium Carbonate | White | S | I |
| Zinc Hydroxide | White | S | S |
| Aluminum Hydroxide | White | S | S |
| Stannous Hydroxide | White | S | S |
| Lead Hydroxide | White | S | S |
| Chromium Hydroxide | White | S | S |
| Lithopone | White | S | I |
| Gypsum | White | S | I |
| Cadmium Yellow | Yellow | S | I |
| Cadmium Red | Red | S | I |
| Antimony Vermilion | Vermilion | S | I |
| Calcium Hydrogen Phosphate | White | S | I |

*"S" stands for "soluble" and "I" for "insoluble".

The above-mentioned inorganic pigment is incorporated in an amount sufficient to provide a color mark on fabric which can be seen clearly and distinctly. The amount varies depending on a particular pigment used and generally falls within the range of 15 to 60% by weight based on the total weight of the composition.

The above inorganic pigment can be dispersed in water by stirring, but settles in a relatively short time due to its specific gravity larger than water. Thus, an anti-settling agent is added in the composition in order to maintain the pigment dispersed in water for a relatively long time, satisfying the requirement (II).

The anti-settling agents used in the invention may be classified into those which render the water dispersion so viscous as to retard the settling of the pigment (i.e. thickening agents) and those which adsorb the pigment to increase the volume of the pigment and consequently to retard the settling of the pigment (i.e. adsorbing agents).

Among the thickening agents are water-soluble polymers such as gelatin, tragacanth gum, starch, water-soluble methyl cellulose, carboxymethyl cellulose, polyvinyl alcohol, polyacrylate and sodium alginate, and bentonite and the like. Examples of the adsorbing agents are diatomaceous earth, clays, talc or the like. Some of the pigments shown in Table 1 have adsorbalility, such as barium sulfate, barium carbonate, calcium carbonate, magnesium carbonate and calcium hydrogen phosphate. It is therefore often useful to use these pigments with the other pigments having the same colors.

These anti-settling agents are contained in the compositions of the invention in an amount sufficient to maintain the pigments dispersed in the composition.

The amount can be varied depending on the particular agent used, and the optimum amount for the particular agent can be readily determined by preliminary experiments. Further, the amount of the anti-settling agent varies depending on desired stability of the dispersion.

To stabilize the dispersion it is often preferable to use a mixture of the thickening agents and the adsorbing agents. For the same purpose a surfactant may be used.

The marking composition according to this invention further contains a volatilization retardant in an amount sufficient to make the evaporation rate of the dispersion lower than that of water. The retardant of such amount can decrease the evaporation rate of the composition and prevent a quick drying of the composition and thus a clogging of the hollow needle. Generally, the volatilization retardant comprises normally liquid organic compounds which are miscible with water and have evaporation rates lower than that of water, and solid organic compounds, e.g. urea, which dissolve in water so as to lower the evaporation rate of water.

The normally liquid organic compounds include polyhydric alcohols such as ethylene glycol, diethylene glycol, triethylene glycol, propyrene glycol and glycerine, and amines such as ethanolamine, diethanolamine and triethanolamine.

It should be noted that the above-illustrated amines dissolve in water so as to produce basic solutions. Therefore, if these amines are used as volatilization retardants it is necessary to employ as the pigment such pigments as do not dissolve in base, in other words, those which dissolve only in acid.

The amount of the volatilization retardant can be varied as desired.

To make the color mark made by a marking composition which becomes non-adherent in about five to ten minutes after marking to fulfil the above requirement (III), the marking composition should have such a good penetrability that the all components of the composition other than the inorganic pigment can be easily absorbed by fabric. For this reason the color marking composition of the invention contains a water-miscible penetrant having a surface tension lower than water, which does not have so good a penetrability to fabric. The penetrant lowers the surface tension (72.25 dyne/cm) of water and improves the penetrability to fabric of the composition.

Examples of the penetrant are triethylene glycol (45.2 dyne/cm), glycerine (64.3 dyne/cm) and triethanolamine (48.3 dyne/cm). The penetrant is contained in the composition in an amount sufficient to improve the penetrability to fabric of the composition, i.e., in an amount sufficient to cause the composition to be absorbed by fabric in about five to ten minutes after marking. The fabric is of course a factor in determining the amount of the penetrant used.

The marking composition of the invention containing the above-mentioned components can put a color mark on each of piled fabric pieces by passing a hollow needle through the fabric pieces at a prescribed position and ejecting, during piercing of the needle into or out of the fabric pieces, the marking composition from the tip of the needle. The viscosity of the composition is determined by the inner diameter of the needle. It is generally about 1 to about 1500 centipoises.

The marking composition of the invention is particularly suitable if used with a fabric-marking apparatus disclosed in my copending Japanese Patent Application No. 115936/74 filed Oct. 8, 1974. Briefly speaking, the fabric-marking apparatus comprises a marking ink tank and an ink pump received in the ink tank and comprised of a reciprocable cylinder having holes in the wall thereof and a fixed plunger disposed in the cylinder. An elastic valve member having a fine aperture is provided in a liquid-tight state between the lower portion of the cylinder and the bottom portion of the ink tank. To the valve member is connected a hollow needle which communicates with the inner space of the ink pump through the fine aperture. When the plunger is drawn out from the cylinder by the descent of the needle, the elastic valve member allows marking ink to flow from the tank through the hole in the cylinder into the inner space of the ink pump. When the plunger is urged into the ink tank by the rise of the needle, the fine aperture formed in the valve member is opened to discharge marking ink from the ink pump into the needle, thereby depositing marking ink on each of the piled fabric pieces.

Examples of the dispersion composition for providing a color mark on fabric according to the invention are shown below in Table 2.

Table 2

| Components | Parts by weight | | | |
| --- | --- | --- | --- | --- |
| | Ex. A (white) | Ex. B (white) | Ex. C (white) | Ex. D (white) |
| Calcium Carbonate | 100 | 50 | — | 100 |
| Zinc White | — | 50 | — | 100 |
| Aluminum Hydroxide | — | — | 100 | — |
| Water | 100 | 100 | 100 | 200 |
| Glycerine | 100 | — | 100 | 100 |
| Urea | 10 | 10 | 10 | 15 |
| Bentonite | 1 | 1 | 1 | 12 |
| Carboxymethyl Cellulose (CMC) | 1 | 1 | 1 | 1 |

It has been found that if the inorganic pigments used in the composition of the invention are white pigments soluble only in either acid or base, and if an acid-base indicator exhibiting a color in acidic region or basic region and being colorless in the other one of these regions is further incorporated, marking compositions which can provide various color marks can be obtained by adjusting the pH of the compositions so as to cause colors come out from the indicator. The white pigments can be those which partially dissolve in water to produce an acidic or basic solution. For example, a saturated aqueous solution of zinc white exhibits a pH of 6 to 7, that of calcium carbonate a pH of 7 to 8 and that of aluminum hydroxide a pH of 4 to 5. If such a pigment is used, the indicator should exhibit color in the above pH region. In the composition including the acid-base indicator, the white pigment serves to impart covering power to the color exhibited by the indicator.

Examples of the acid-base indicator are listed below in Tables 3 and 4.

Table 3

| Acid-base indicators exhibiting color in basic region and colorless in acidic region | | |
| --- | --- | --- |
| | Color in basic region | Color change interval (pH) |
| Quinaldine Red | Red | 1.4–3.2 |
| Pinachrome | Red | 5.–7.8 |
| p-Cresolphthalein | Red | 8.–9.2 |
| o-Cresolphthalein | Red | 8.2–9.3 |
| Bromophenol Purple | Purple | 8.0–12.0 |
| Ethylbisacetate | Blue | 7.5–9.1 |
| Thymol Phthalein | Blue | 7.3–10.5 |
| α-Dinitrophenol | Yellow | 2.5–4.4 |
| β-Dinitrophenol | Yellow | 2.4–4.0 |
| γ-Dinitrophenol | Yellow | 4.0–5.8 |
| p-Nitrophenol | Yellow | 5.6–7.6 |
| m-Nitrophenol | Yellow | 6.8–8.4 |
| 1,3,5-Trinitrobenzene | Orange | 12.0–14.0 |
| 2,4,6-Trinitrobenzoic Acid | Orange-like | 12.0–13.4 |
| Mitramine | Reddish Brown | 10.8–12.8 |

Table 4

| Acid-base indicators exhibiting color in acidic region and colorless in basic region | | |
| --- | --- | --- |
| | Color in acidic region | Color change interval (pH) |
| Heptamethoxy Red | Red | 5.0–7.0 |
| Pentamethoxy Red | Reddish Purple | 1.2–3.2 |
| Hexamethoxy Red | Reddish purple | 2.6–4.6 |
| Basic Fuchsine | Reddish purple | 12.0–13.0 |
| Acidic Fuchsine | Reddish purple | 12.0–14.0 |
| Crystal Violet | Violet | 12.0–13.0 |
| Methyl Green | Bluish Green | 11.0–12.0 |

As noted above, the white pigment in the composition containing the acid-base indicator serves to impart covering power to the color. It is therefore obvious that if the indicator exhibits color in basic region and is colorless in acidic region the white pigment should be insoluble in base and soluble in acid and if the indicator exhibits color in acidic region and is colorless in basic region the white pigment employed should be insoluble in acid and soluble in base. Adjustment of the pH of the composition can be effected by adding an appropriate acid or base in the appropriate amount, or by varying the content of a volatilization retardant or penetrant in the composition which exhibits basicity.

Examples of the composition including the acid-base indicator are illustrated below in Table 5.

Table 5

| Components | Parts by weight | |
| --- | --- | --- |
| | Example E (yellow) | Example F (red) |
| Calcium Carbonate | 100 | — |
| Aluminum Hydroxide | — | 150 |
| Water | 100 | 200 |
| Glycerine | 100 | 100 |
| Urea | 10 | 30 |
| Bentonite | 1 | 3 |
| CMC | 1 | 2 |
| p-Nitrophenol | 5 | — |
| Hexamethoxy Red | — | 10 |

The following example illustrates the procedure in which a color mark is put on each of piled fabric pieces at the same time.

EXAMPLE

Use was made of the fabric-marking apparatus of the abovementioned Japanese Patent Application No. 115936/74. The needle of the apparatus was about 155 mm in length, about 0.3 mm in inner diameter and about 0.7 mm in outer diameter. The ink tank was charged with the marking composition of Example A, and fabric pieces piled 150 mm thick were set at the lower portion of the apparatus. A white mark about 0.5 mm in diameter was uniformly put on all the fabric pieces at the same time.

The mark thus put on each fabric piece became non-adherent in about three minutes, and well stood the subsequent water-spraying and ironing. After the fabric piece was sewn to a cloth, the mark was easily eliminated by contact with a 5% aqueous solution of acetic acid.

It was found that no noticeable settling of the white pigment (calcium carbonate) in the composition occurred over several months.

What is claimed is:

1. A method of putting a color mark on each of piled fabric pieces, which mark is erasable upon contact with an appropriate acid or base, comprising passing a hollow needle through piled fabric pieces, and, during piercing of the needle into or out of the fabric pieces, ejecting from the needle a marking composition, said composition comprising a water dispersion of a heat-resistant inorganic pigment in an amount sufficient to provide the color mark on each fabric piece, said pigment being soluble in acid and/or base and substantially insoluble in water, an anti-settling agent in an amount sufficient to maintain the pigment dispersed in water; a water-miscible water volatilization retardant in an amount sufficient to make the evaporation rate of the dispersion lower than that of water; and a water-miscible penetrant having the property of lowering the surface tension of water in said amount sufficient to improve the penetrability of the composition to the fabric piece; and then erasing the mark with an appropriate acid or base.

2. The color marking method according to claim 1 wherein the inorganic pigment constitutes 15 to 60% by weight based on the total weight of the composition.

3. The method according to claim 1 wherein the inorganic pigment is a white pigment which is soluble only in base, and the composition further contains an acid-base indicator which exhibits color in the acidic region and is colorless in basic region and an acid to maintain the colored state of the indicator.

4. The color marking method according to claim 1 wherein the inorganic pigment is a white pigment which is soluble only in acid, and wherein the composition further contains an acid-base indicator which exhibits color in the basic region and is colorless in the acidic region and a base to maintain the colored state of the indicator.

5. The color marking method according to claim 4 wherein the acid-base indicator is quinaldine red, pinachrome, p-cresolphthalein, o-cresolphthalein, bromophenol purple, ethylbisacetate, thymolphthalein, α-dinitrophenol, β-dinitrophenol, γ-dinitrophenol, p-nitrophenol, m-nitrophenol, 1,3,5-trinitrobenzene, 2,4,6-trinitrobenzoic acid or nitramine.

6. The color marking method according to claim 1 wherein the inorganic pigment is zinc white, cadmium oxide, zinc yellow, antimony white, titanium oxide, calcium carbonate, magnesium carbonate, basic lead carbonate, barium carbonate, zinc hydroxide, aluminum hydroxide, stannous hydroxide, lead hydroxide, chromium hydroxide, lithopone, gypsum, cadmium yellow, cadmium red, antimony vermilion, calcium hydrogen phosphate or a mixture thereof.

7. The color marking method according to claim 6 wherein the anti-settling agent is a pigment adsorbing agent selected from the group consisting of diatomaceous earth and clay.

8. The color marking method according to claim 6 wherein the anti-settling agent is a thickening agent selected from the group consisting of gelatin, tragacanth gum, starch, water-soluble methyl cellulose, carboxymethyl cellulose, polyvinyl alcohol, polyacrylate, sodium alginate, bentonite and a mixture thereof.

9. The color marking method according to claim 8 wherein the volatilization retardant is urea, ethylene glycol, diethylene glycol, triethylene glycol, glycerine, ethanolamine, diethanolamine or triethanolamine.

10. The color marking method according to claim 9 wherein the penetrant is triethylene glycol, glycerine or triethanolamine.

* * * * *